Nov. 24, 1959 B. DEROUET 2,914,666

DEVICE FOR IMPROVING THE RECEPTION OF PULSE-TYPE RADIO SIGNALS IN THE PRESENCE OF NOISE

Filed May 6, 1955

INVENTOR
BRICE DEROUET
BY Paul M. Craig, Jr.
ATTORNEY.

United States Patent Office 2,914,666

Patented Nov. 24, 1959

2,914,666

DEVICE FOR IMPROVING THE RECEPTION OF PULSE-TYPE RADIO SIGNALS IN THE PRESENCE OF NOISE

Brice Derouet, Paris, France, assignor to Compagnie Generale de Telegraphie Sans Fil, a corporation of France Application May 6, 1955, Serial No. 506,524

Claims priority, application France May 28, 1954

3 Claims. (Cl. 250—20)

The present invention relates to a device for improving the transmission of radio signals in the presence of noise and more particularly to transmission systems utilizing, as the vehicle for the information to transmit, recurrent electromagnetic pulses.

As an example of such a transmission system there may be mentioned any radar pulse unit. In the video amplifying stages at the receiving end, the transmitted information is presented in the form of recurrent pulses in the presence of noise. The video signal of the radar may be readily distinguished on the screen of the receiver indicator so long as the amplitude of the pulses forming this signal is higher than the mean noise level. The latter is distributed more or less uniformly over the entire band of received frequencies. On the other hand, the signal formed of pulses of recurrent frequency F may be considered as being obtained by the superposition of sinsoidal signals having frequencies F, 2F, . . . $n$F, etc. where $n$ is of the order of at least 500–1,000. Now filters capable of passing solely the signals which have recurrent frequency F and a high number of harmonics, are known. Such filters, termed "comb filters" are the subject matter of my joint copending application Serial Number 481,460, filed on January 12, 1955, for "Magnetostrictive band pass filter," now abandoned.

Such filters permit improving the transmission of pulse modulated signals for example. But when the duration of a pulse is very short relative to the recurrent frequency thereof, the number of harmonics transmitted by such a filter becomes insufficient and the pulses are very distorted, and this distortion causes a widening of the pulses. This is very troublesome in the case of radar where the shape of the received pulses supplies information about the located target.

The object of the invention is to provide a device for improving the transmission of radio recurrent pulses without distorting the shape of the pulses.

The device embodying the invention comprises means for blocking the amplification chain at least one point and deblocking this chain solely during recurrent periods of time which are of duration slightly greater than the duration of the pulses to transmit and have the same recurrent frequency as the latter, whereby noise is eliminated during the blocking periods, the latter constituting the major part of the total duration of the message.

The invention will be better understood from the ensuing description with reference to the accompanying drawings in which.

Figure 1:
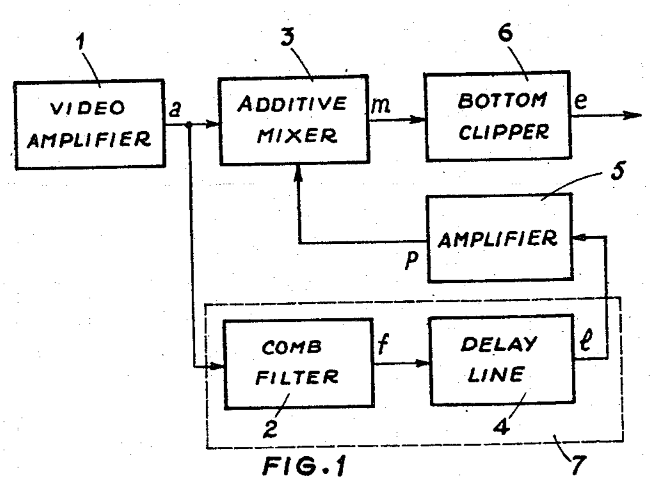
Fig. 1 is a block diagram of a device embodying the invention.

In Fig. 1, 1 designates a video amplifier of a receiver 8 adapted to amplify the received pulses of recurrent frequency F which are previously detected in a known manner. The output of this amplifier is connected to the input of a comb filter 2 of the above mentioned magnetostrictive type tuned to the frequency F, and furthermore, to one input of an additive mixer 3 having two inputs.

The output $f$ of the filter 2 is connected to the input of a delay line 3 adapted to delay the signal transmitted thereby, by half a period $T/2$, T being equal to $$\frac{1}{F}$$

Preferably, this delay line is a magnetostrictive delay line, comprising a wire which is formed of the same material and has the same section and length as the wire of the filter 2.

The output of this delay line is connected to the input of an amplifier whose output is connected to the second input of the mixer 3. The output of this mixer is connected to the input of a bottom clipper 6 at the output of which a pulse is received.

Figure 2:
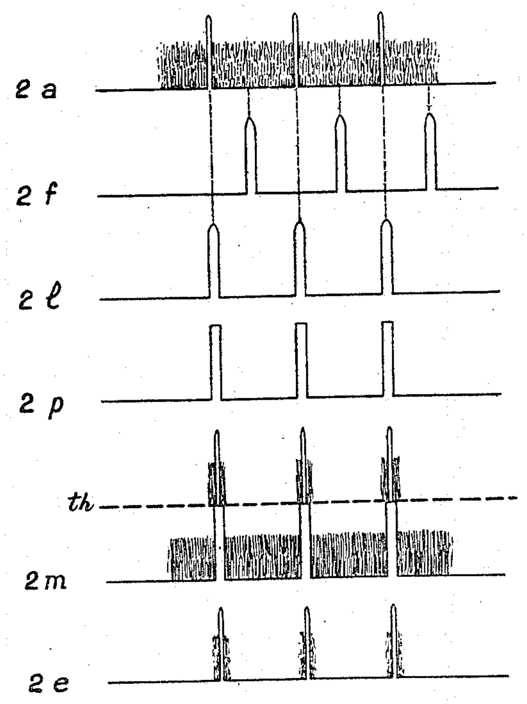
Fig. 2 shows the shape of the signals at different stages of the device shown in Fig. 1.

The operation of this device will be readily understood from Fig. 2.

The pulses of recurrent frequency F, seen at 2$a$, are transmitted in the midst of noise which renders the observation difficult. These pulses are transmitted on the one hand, directly, as has been seen above, to an additive mixer 3 and, on the other hand, to the filter 2 at the output of which is received the signal 2$f$ which is composed of pulses which are dephased to the extent of half a recurrent period relating to the pulses 2$a$, and are substantially widened by the comb filter. A comb filter essentially comprises a wire fixed to the two ends which vibrate to the extent of half a wave at a frequency F, which explains this half period phase shift.

The delay line 4, which may have the structure of a comb filter identical to the aforementioned filter, delays the pulses 2$f$ a further half period, which gives the signal 2$l$. The latter is in phase with the signal 2$a$.

Received at the output of the amplifier 5, are the pulses 2$p$, which are in phase with the pulses 2$l$ but are widened and put into shape. These pulses are injected in the input of the mixer 3 at the output of which is received the signal 2$m$. This signal is the sum of large pulses from the device 5 and the pulses 2$a$ to be received, the latter being situated in the center of the crests of the pulses 2$p$. These pulses are clipped by the bottom clipper 6 at the output of which is received the signal 2$e$. The threshold of that latter device is shown in Figure 2$m$ by the dotted line "$th$."

The signal 2$e$ is none other than the pulse 2$a$ but from which a large part of the noise has been eliminated. Solely the noise included in the duration of one pulse 2$m$ subsists. The amplitude of the noise is also reduced by the bottom clipper.

The device embodying the invention, incorporating a comb filter having a recurrent frequency of 1000 p.p.s., transmitted pulses having a width of 1 microsecond without notable distortion. The resultant improvement in the signal-noise ratio was 20 db.

Preferably, the filter 2 and the delay line 4 are situated in a same heat insulated housing, generally indicated at 7, so that their variations in frequency due to temperature variations are exactly compensated.

The pulse generator of the radar generally also comprises a delay line. Preferably, the latter is similar to the elements 2 and 4 and is disposed in the same housing 7.

What I claim is:

1. In a receiver for pulse modulated signals having a recurrent modulation frequency, and comprising a video amplifier, a device for improving the signal-to-noise ratio of said amplifier comprising in combination: a bottom clipper having an input and an output for passing only the portion of the amplifier output which exceeds a predetermined amplitude, an additive mixer having an output and a first and a second input, said output being connected to said input of said bottom clipper whereby the output of said bottom clipper is said predetermined output portion of said receiver, a comb filter having an input connected to said video amplifier and an output, means for collecting at said filter output, widened pulses having the same recurrent frequency as the received pulses, a delay line having an input connected to said comb filter, means for collecting at said output of said delay line widened pulses synchronised with said received pulses and means for feeding said widened pulses to said second input of said additive mixer, whereby said bottom-clipper passes the portion of the amplifier output which exceeds a predetermined amplitude.

2. Device according to claim 1, wherein said delay line is a magnetostrictive delay line made of the same material as said comb filter.

3. Device according to claim 2 further comprising a heat insulated housing, said comb filter and said delay line being disposed in said housing.

References Cited in the file of this patent

UNITED STATES PATENTS

| | | |
|---|---|---|
| 2,398,490 | Atwood | Apr. 16, 1946 |
| 2,412,994 | Lehmann | Dec. 24, 1946 |
| 2,412,995 | Levy | Dec. 24, 1946 |
| 2,416,424 | Wilson | Feb. 25, 1947 |
| 2,416,895 | Bartelink | Mar. 4, 1947 |
| 2,487,995 | Tucker | Nov. 15, 1949 |
| 2,505,040 | Goodall | Apr. 25, 1950 |
| 2,629,049 | Miller et al. | Feb. 17, 1953 |